United States Patent [19]

Itoh et al.

[11] Patent Number: 4,623,222

[45] Date of Patent: Nov. 18, 1986

[54] LIQUID CRYSTAL TYPE DAZZLE-FREE TRANSMISSIVE-REFLECTIVE MIRROR

[75] Inventors: Hiroshi Itoh, Oubu; Shinya Ohmi, Anjo; Yasutoshi Suzuki, Oubu; Tsuyoshi Fukada, Nagoya; Kunihiko Hara, Aichi, all of Japan

[73] Assignee: Nippondenso Co., Ltd., Kariya, Japan

[21] Appl. No.: 593,946

[22] Filed: Mar. 27, 1984

[30] Foreign Application Priority Data

Nov. 14, 1983 [JP] Japan ................................. 58-213625
Nov. 25, 1983 [JP] Japan ................................. 58-222719

[51] Int. Cl.⁴ ........................ G02F 1/133; G02B 17/00
[52] U.S. Cl. ................. 350/331 T; 350/283; 350/338; 350/342
[58] Field of Search ............... 350/331 R, 331 T, 342, 350/338, 279, 283, 601, 605, 631, 639, 632

[56] References Cited

U.S. PATENT DOCUMENTS

| | | | |
|---|---|---|---|
| 3,705,310 | 12/1972 | Wild | 350/331 T X |
| 3,787,110 | 1/1974 | Berreman et al. | 350/341 |
| 3,921,162 | 11/1975 | Fukai et al. | 350/331 T |
| 3,961,181 | 6/1976 | Golden | 350/331 R X |
| 3,986,022 | 10/1976 | Hyatt | 350/331 R |
| 4,029,393 | 6/1977 | Dungan et al. | 350/331 T X |
| 4,040,727 | 8/1977 | Ketchpel | 350/601 |
| 4,161,653 | 7/1979 | Bedini et al. | 350/332 X |
| 4,200,361 | 4/1980 | Malvano et al. | 350/331 R X |
| 4,279,474 | 7/1981 | Belgorod | 350/331 R |
| 4,491,390 | 1/1985 | Tong-Shen | 350/331 R |

FOREIGN PATENT DOCUMENTS

| | | | |
|---|---|---|---|
| 2604462 | 8/1977 | Fed. Rep. of Germany | 350/331 R |
| 2808260 | 8/1979 | Fed. Rep. of Germany | 350/283 |
| 2029343 | 3/1980 | United Kingdom | 350/331 R |

*Primary Examiner*—John K. Corbin
*Assistant Examiner*—David Lewis
*Attorney, Agent, or Firm*—Cushman, Darby & Cushman

[57] ABSTRACT

A liquid crystal type dazzle-free reflection mirror arrangement which changes reflectivity of the incident light by way of changing the transmittivity of the incident light through a liquid crystal provided within a frame body is disclosed. A semitransparent mirror is positioned behind the liquid crystal and a photo sensor is positioned behind the semitransparent mirror. When the photo sensor detects that the intensity of the incident light passing through the semitransparent mirror, an alternating current electric field is applied to the liquid crystal which responsively decreases the transmittivity of the incident light. A heater for heating the liquid crystal is activated when a door of an automobile is opened and the temperature of the liquid crystal is low.

20 Claims, 6 Drawing Figures

LIQUID CRYSTAL TYPE DAZZLE-FREE TRANSMISSIVE-REFLECTIVE MIRROR

RELATED APPLICATIONS

The subject matter of this application is related in general to the subject matter of the following applications: Itoh et al. Ser. No. 616,185, filed June 1, 1984, Itoh et al, Ser. No. 670,015, filed Nov. 9, 1984, Ohmi et al, Ser. No. 671,612, filed Nov. 15, 1984, and Itoh et al, Ser. No. 701,224, entitled DRIVING APPARATUS FOR DAZZLE-FREE REFLECTION MIRRORS OF A VEHICLE, filed Feb. 13, 1985. These cases all relate in general to dazzle-free mirrors.

BACKGROUND OF THE INVENTION

The present invention relates to a liquid crystal type dazzle-free reflection mirror, and more particularly to the reflection mirror, wherein reflectivity of light is controlled electrically utilizing an electro-optical property of the liquid crystal.

The reflection mirror according to the present invention can be utilized in rear-view mirrors for automobiles, such as a room (inside) mirror and a side (side view) mirror of an automobile.

A reflection mirror of dazzle-free type using a liquid crystal has been provided with a photo sensor around the outside of a frame body of the reflection mirror in order to detect light projected onto the reflection mirror from the rear side thereof.

This structure, however, has a disadvantage in that not only the light projected directly onto the reflection mirror but also the light projected from a lateral direction are detected. Thus the dazzlement preventing function may be unnecessarily performed when light is laterally projected onto the mirror.

In order to eliminate the disadvantage, another structure is considered where a photo sensor is installed within the frame body of the reflection mirror so as to directly detect only the light transmitted through the liquid crystal and a window of a reflection layer formed on one end surface of the liquid crystal.

This structure also has disadvantages in that the position adjustment to install the photo sensor is difficult and the window on the reflection layer produces partial lack of the reflected image resulting in an unclear image.

Moreover, the liquid crystal type reflection mirror requires an undesirably long period of time to be driven into an operative condition under the cold state where the liquid crystal must be heated.

SUMMARY OF THE INVENTION

It is a primary object of the present invention to provide a liquid crystal type dazzle-free reflection mirror which provides a dazzlement preventing function only when necessary (under a required condition) and provides a full and clear image.

It is a further object of the present invention to provide a liquid crystal type dazzle-free reflection mirror which requires a shorter period of time (shorter than for known arrangements) for the liquid crystal thereof to be driven into an operative state.

In a liquid crystal type dazzle-free reflection mirror according to the present invention, a liquid crystal assembly supported within a frame body is provided with a semi-transparent mirror layer at the rear-most portion thereof and a photo sensor behind the semi-transparent mirror layer for sensing the intensity of light transmitted through the liquid crystal assembly including the semi-transparent mirror layer. A liquid crystal drive circuit responsive to the photo sensor is connected to provide a voltage across electrode layers of the liquid crystal assembly when the intensity of light sensed by the photo sensor is high. The liquid crystal layer between the electrode layers decreases the transmittivity of light in response to the electric field produced by the voltage across the electrode layers so that the reflection mirror becomes dazzle-free.

In the reflection mirror according to the present invention, a heater for heating the liquid crystal layer is provided and activated in response to the opening of an automobile door so that the liquid crystal layer is driven into the operative condition as soon as possible.

The liquid crystal type dazzle-free reflection mirror further comprises a heater circuit for heating the liquid crystal in response to the opening of an automobile door when the temperature of liquid crystal is low.

The liquid crystal in the liquid crystal type dazzle-free reflection mirror may be of any kind, as long as it can vary transmittivity of the light on application of an electric field. For example, one could use a DSM type liquid crystal element in which application of the electric field produces dynamic scattering and transmittivity of light is controlled by the scattering, a twist nematic type liquid crystal element in which nematic liquid crystal and a polarizer are used and transmittivity of light is controlled utilizing optical activity, a guest-host type liquid crystal element having two-color pigments to absorb only light polarized in one direction is mixed with the liquid crystal, a liquid crystal element utilizing electric field controlled double refraction effect, and liquid crystal element utilizing transition effect between cholestric and nematic phases thereof.

The semitransparent mirror layer may be formed by evaporation of metal or non-metal to a desired depth so as to set the transmittivity and reflectivity at a suitable ratio. For example, zinc sulphide (ZnS), cerium oxide ($CeO_2$) and titanium oxide ($TiO_2$) with a depth of evaporated layer set to a quarter of wavelength may be used. Otherwise, aluminum silver, chromium or gold may used also.

DETAILED DESCRIPTIONS OF PREFERRED EMBODIMENTS

The present invention will now be described in detail with reference to the drawings.

Figure 1:
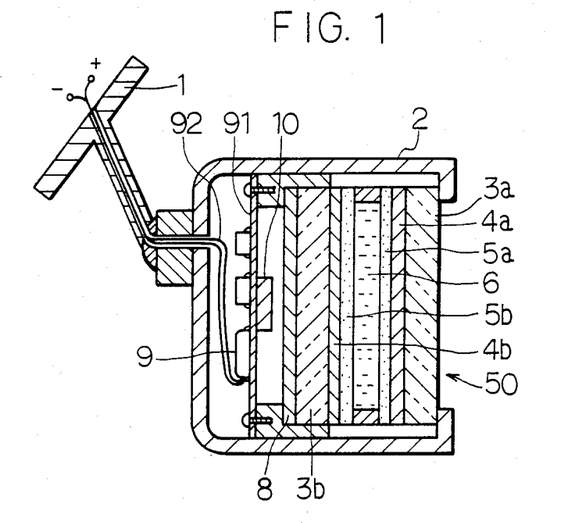
FIG. 1 is a sectional view showing a liquid crystal type dazzle-free reflection mirror according to the invention.

Referring first to FIG. 1, a liquid crystal type dazzle-free reflection mirror is provided with a mounting tool 1 for mounting the reflection mirror onto an automobile ceiling as an interior rear-view mirror. A frame body 2, having a generally closed shape except the front open end, is secured to the mounting tool 1 and receives therein a liquid crystal assembly 50.

The liquid crystal assembly 50 includes a transparent glass substrate 3a, a transparent electrode layer 4a, a transparent orientation film 5a for aligning elements of liquid crystal in parallel, a liquid crystal layer 6 of nematic liquid crystal to produce DSM, a transparent orientation film 5b, a transparent electrode layer 4b, a transparent glass substrate 3b and a semi-transparent mirror layer 8 in the named order from the open front end of the frame body 2. The liquid crystal layer 6 produces dynamic scattering upon the application of a voltage across electrode layers 4a and 4b and the transmittivity of light through the liquid crystal layer is controlled by the scattering so that the light reflectivity of the reflection mirror as a whole is controlled electrically. Thickness of the transparent electrode layers 4a and 4b is 1000 Å, and thickness of the liquid crystal layer 6 is 10 μm. The semi-transparent mirror layer 8 is made of aluminium and 200 Å in thickness. The semi-transparent mirror layer 8 transmits only a portion of the incident light therethrough and reflects the other portion of the incident light so that a rear view of a viewer facing the open front end of the frame body 2 may be provided.

A photo diode 10 used as a photo sensor to detect the light transmitted only through the open front end of the frame body 2 and the liquid crystal assembly 50 is installed at the rear side of the semi-transparent mirror layer 8. The photo diode 10 is arranged on a printed circuit substrate 91 to face the semi-transparent mirror layer 8. A drive circuit 9 which applies a voltage across the electrode layers 4a and 4b is supplied with power from a battery held on a vehicle body through a power source line 92. The drive circuit 9 is also arranged on the substrate 91.

Figure 2:
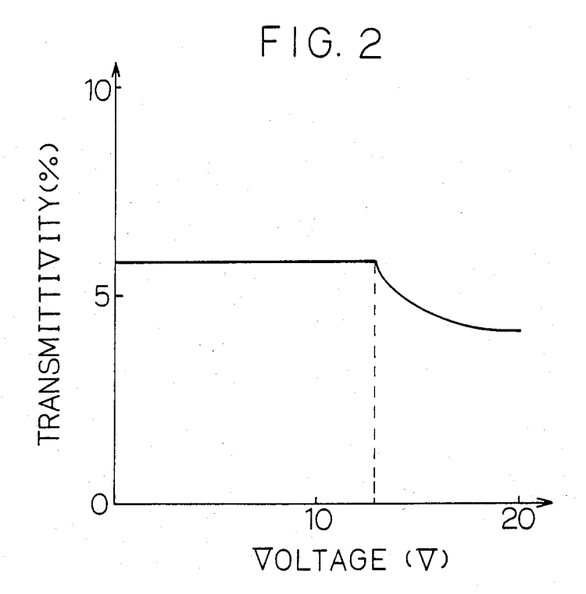
FIG. 2 is a graph showing a relation between a voltage applied to a liquid crystal layer and a transmittivity of light through a semi-transparent mirror layer shown in FIG. 1.

FIG. 2 is a graph showing the relation between a voltage applied across electrode layers 4a and 4b and a transmittivity of light through the liquid crystal layer 6 measured by detecting the light transmitted through the semi-transparent mirror layer 8. As seen in the graph, the transmittivity of liquid crystal becomes maximum when the voltage is not applied across the electrodes 4a and 4b and the rate of light transmitted through the semi-transparent mirror layer 8 is about 6%. The dynamic scattering occurs at voltage of 13 V and the intensity of light transmitted through the semi-transparent mirror layer 8 varies and transmittivity decreases to 4%. The intensity of light detected by the photo diode 10 in this manner is dependent on whether or not the dazzlement is prevented by the application of voltage across electrodes 4a and 4b.

Figure 3:
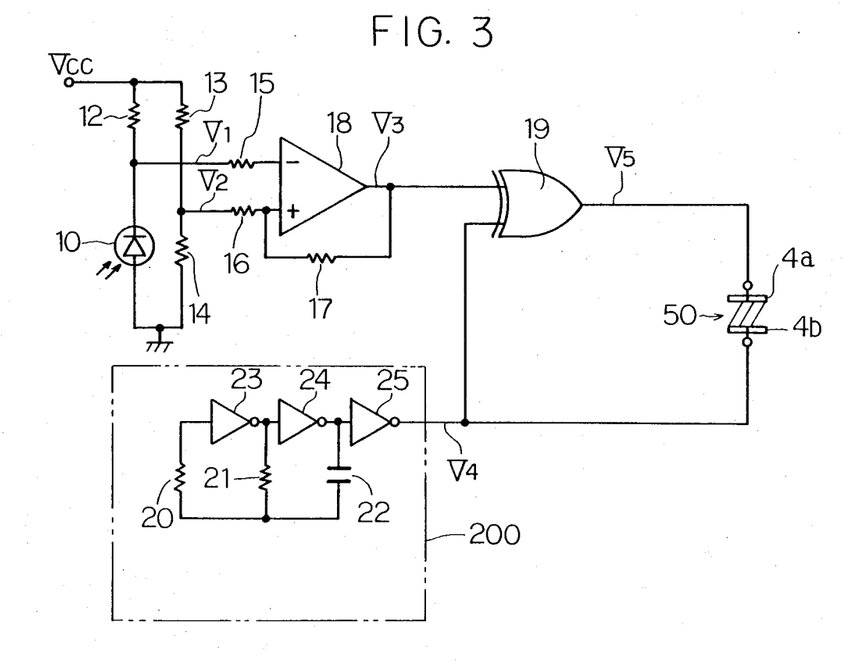
FIG. 3 is a circuit diagram showing a liquid crystal drive circuit shown in FIG. 1.

Referring now to FIG. 3 there is shown a circuit diagram of liquid crystal drive circuit 9. An inverting input terminal of a comparator 18 receives a voltage $V_1$ at a junction between a resistor 12 and the photo diode 10 as a detecting voltage. A non-inverting input terminal of the comparator 18 receives a divided voltage $V_2$ of a battery voltage Vcc from a junction between resistors 13 and 14 as a reference voltage. A positive-feedback resistor 17 is connected between the non-inverting input terminal and the output terminal of the comparator 18. The purpose of positive-feedback resistor 17 is to provide the comparator 18 with a hysteresis characteristic. That is, the reference voltage $V_2$ is set to high and low levels $V_{T1}$ and $V_{T2}$ when the output voltage $V_3$ of the comparator 18 is high and low, respectively. An output voltage $V_3$ of the comparator 18 is applied to a first input of an exclusive-OR circuit 19, and an output voltage $V_5$ of the exclusive-OR circuit 19 is applied to the transparent electrode layer 4a. A pulse output voltage $V_4$ of a pulse oscillator 200 is applied to a second input of the exclusive-OR circuit 19. The output voltage $V_4$ is also applied to the transparent electrode layer 4b. The pulse oscillator 200 for generating a pulse voltage comprises C-MOS inverters 23, 24, 25 and a combination of resistors 20, 21 and a capacitor 22 as shown in FIG. 3, which determined the oscillator time constant of the pulse oscillator.

The liquid crystal drive circuit shown in FIG. 3 operates in the following manner.

Figure 4:
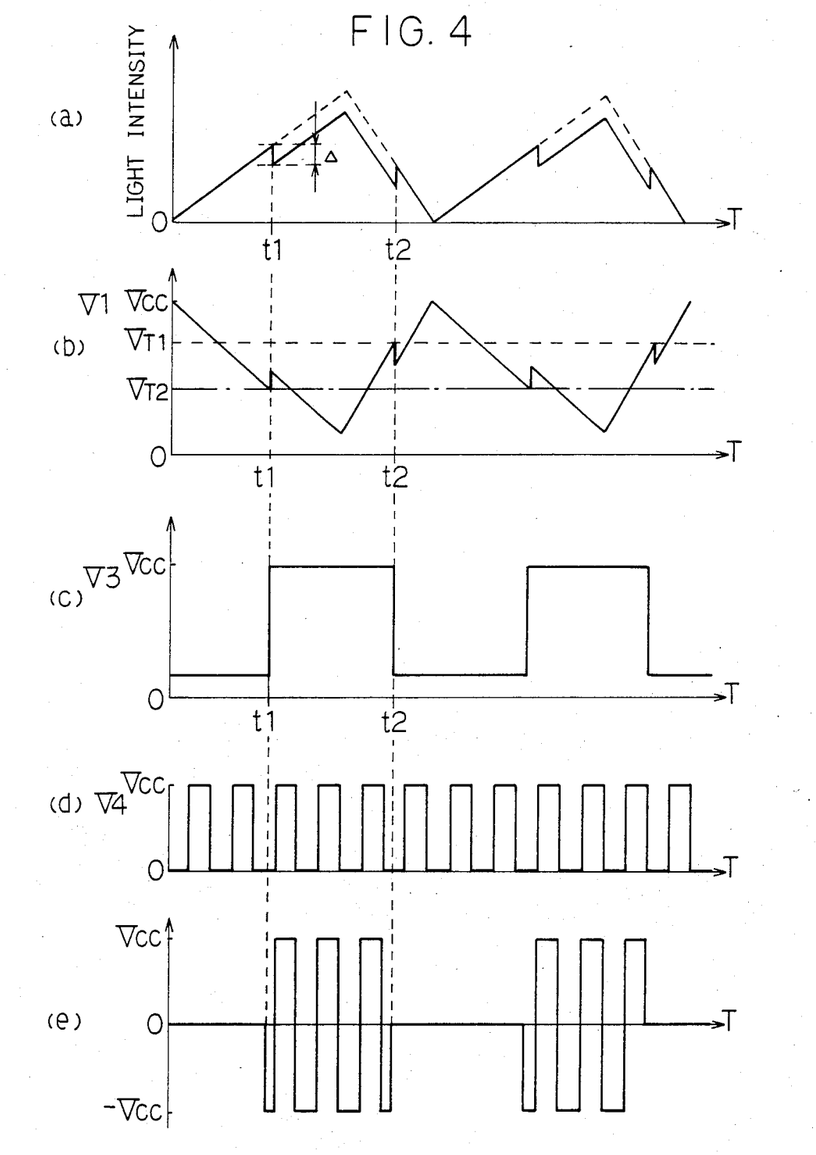
FIG. 4 including waveforms (a)–(e) are timing charts showing output signals produced by the drive circuit shown in FIG. 3.

As long as the intensity of incident light transmitted through the liquid crystal assembly 50 and sensed by the photo diode 10 is low, the voltage $V_1$ is higher than the low level reference voltage $V_{T1}$ and the comparator 18 produces a low level voltage $V_3$ as shown in (c) of FIG. 4 so that the exclusive-OR circuit 19 produces the pulse voltage $V_5$ which is the same in phase as the pulse voltage $V_4$ produced by the pulse oscillator 200 and shown in (d) of FIG. 4. The electrode layers 4a and 4b, receiving the pulse voltages $V_5$ and $V_4$ in the same phase, is applied with no voltage thereacross as shown in (e) of FIG. 4. Thus no electric field is generated across the electrode layers 4a and 4b and the liquid crystal layer 6 keeps the highest transmittivity of light.

As the intensity of the incident light through the liquid crystal assembly 50 increases as shown in (a) of FIG. 4, the voltage $V_1$ correspondingly decreases as shown in (b) of FIG. 4 and attains the low reference voltage $V_{T2}$ at a time $t_1$. The output voltage $V_3$ of the comparator 18 becomes high as shown in (c) of FIG. 4. As the voltage $V_3$ becomes high, the reference voltage $V_2$ is increased to the high level $V_{T1}$. With the high level voltage $V_3$ from the comparator 18 and the pulse output voltage $V_4$ from the pulse oscillator 200, the exclusive-OR circuit 19 produces the pulse voltage $V_5$ which is opposite in phase to the pulse output voltage $V_4$ shown in (d) of FIG. 4. Thus at the time $t_1$, the electrode layers 4a and 4b are supplied with the voltages $V_5$ and $V_4$, respectively, which result in the application of alternating current voltage shown in (e) of FIG. 4 across the electrodes 4a and 4b. With the electric field provided between the electrodes 4a and 4b, the liquid crystal layer 6 presents a dynamic scattering so that the transmittivity of the light through the liquid crystal layer 6 and hence the light reflected by the semi-transparent mirror layer 8 is decreased to provide the dazzlement preventing function.

The intensity of incident light detected by the photo diode 10 decreases by an amount Δ as shown in (a) of FIG. 4 at the time $t_1$. The voltage $V_1$ rises correspondingly but does not attain the high reference voltage $V_{T1}$. Thus the output voltage $V_3$ of the comparator 18 maintains the high level until a time $t_2$ when the voltage $V_1$ attains the high reference voltage $V_{T1}$ again due to the decrease in the intensity of light, and the dazzlement preventing function is maintained in spite of the decrease in the intensity of the light passing through the liquid crystal assembly 50 at the time $t_1$.

When the intensity of light passing through the liquid crystal assembly 50 decreases enough and the voltage $V_1$ correspondingly increases above the high reference voltage $V_{T1}$ at the time $t_2$, the comparator 18 produces the low level output voltage $V_3$ as shown in FIG. 4(c). As described above with respect to the interval before the time $t_2$, no voltage is applied across the electrode layers 4a and 4b as shown in FIG. 4(e) and the dazzlement preventing function is released.

Figure 5:
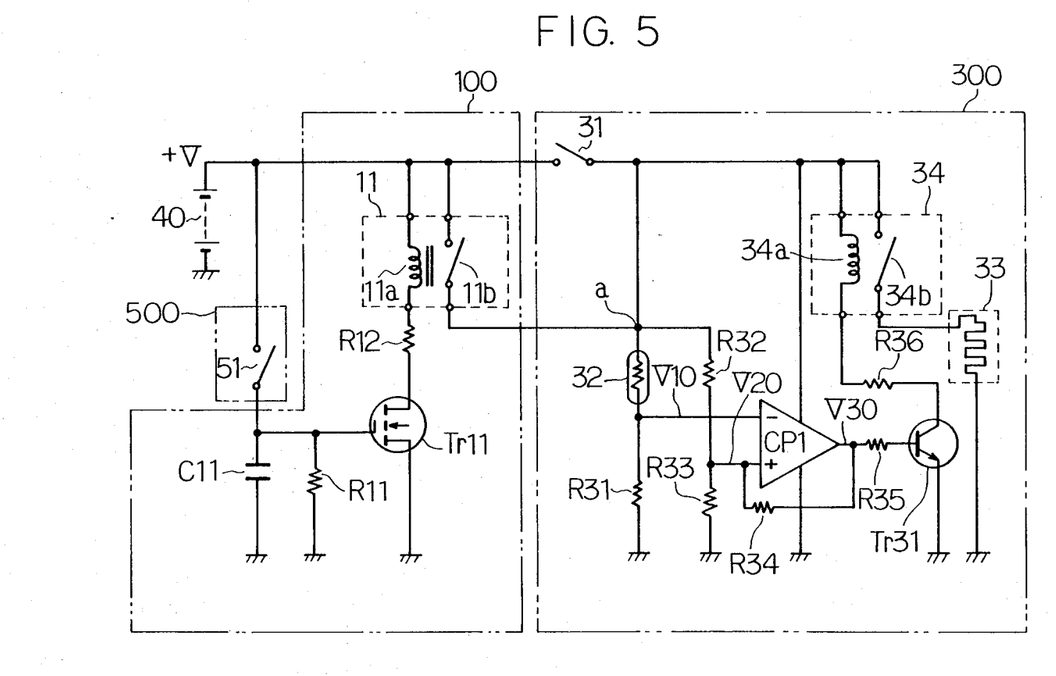
FIG. 5 is a circuit diagram showing a heater circuit.
Figure 6:
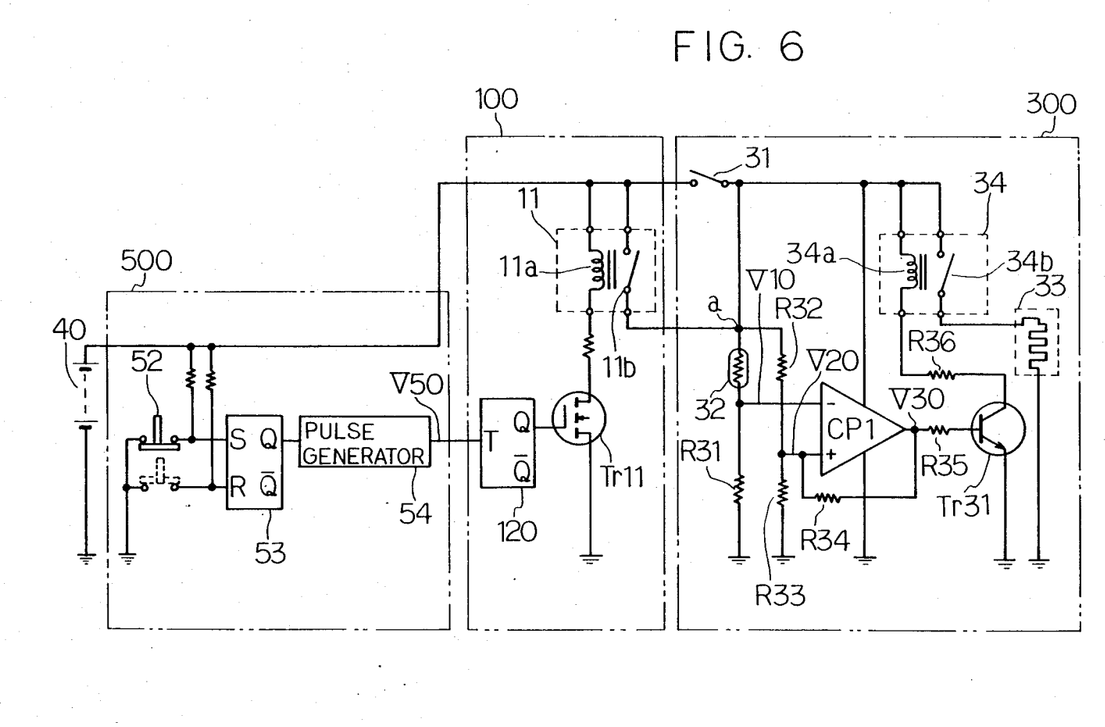
FIG. 6 is a circuit diagram showing an alternative heater circuit.

Reference is now made to FIGS. 5 and 6 which show, respectively, alternative embodiments of a heater circuit for the reflection mirror shown in FIG. 1.

Referring to FIG. 5, the heater circuit generally comprises a temperature control unit 300 for holding the liquid crystal layer 6 at an operative temperature, a door sensor 500 for detecting opening or closing state of a door of the automobile adjacent to a driver's seat, and a power supply control unit 100 for supplying the temperature control unit 300 with power for a certain time. The heater circuit may be provided on the printed circuit substrate 91 with the drive circuit 9.

The temperature control unit 300 has a heater 33 for heating the liquid crystal layer 6 and a thermistor 32 for detecting the temperature or the operativeness of the liquid crystal layer 6. Although not shown, the heater 33 may be shaped into a transparent layer and provided behind the semi-transparent mirror layer 8, while the thermistor 32 may be provided adjacent to the photo diode 10. A comparator CP1 is supplied with power from a battery 40 through a power supply switch 31 interlocked with an ignition switch (not shown) of the automobile. A non-inverting input terminal of the comparator CP1 receives a reference voltage $V_{20}$ established by voltage dividing resistors $R_{32}$ and $R_{33}$. An inverting input terminal of comparator CP1 receives a detected voltage $V_{10}$ established by the dividing action of thermistor 32 and a resistor $R_{31}$. The thermistor 32 detects a temperature of the liquid crystal layer 6 and has a negative temperature characteristics. The voltages $V_{10}$ and $V_{20}$ are generated through the power supply switch 31. A positive feedback resistor $R_{34}$ is connected to the comparator CP1. The resistor $R_{34}$ provides comparator CP1 with a well known hysteresis characteristic in order to prevent chattering regarding conduction of the heater 33 (heater would be turning on and off). An output voltage $V_{30}$ of the comparator CP1 is connected through a resistor $R_{35}$ to the base of a transistor $Tr_{31}$. The collector of the transistor $Tr_{31}$ is connected through a current-limiting resistor $R_{36}$ to an exciting coil 34a of a relay 34, and the exciting coil 34a is connected through the power supply switch 31 to the positive electrode of the battery 40. A relay contact 34b is connected to the heater 33 so as to control the power supply to the heater.

The power supply control unit 100 comprises a capacitor $C_{11}$, a resistor $R_{11}$, a transistor $Tr_{11}$, and a relay 11. The transistor $Tr_{11}$ is an N-channel enhancement MOS-FET. The positive electrode of the capacitor $C_{11}$ is connected to the insulation gate of the transistor $Tr_{11}$, and the drain of the transistor $Tr_{11}$ is connected through a current-limiting resistor $R_{12}$ to an exciting coil 11a of a relay 11. The resistor $R_{11}$ discharges the charge stored in the capacitor $C_{11}$, and constitutes, together with the capacitor $C_{11}$, the discharging circuit to measure a predetermined time after receiving a signal from the door sensor comprising a limit switch 21 interlocked with a door handle of the automobile, not shown.

Operation of the heater circuit shown in FIG. 5 will now be described. It is assumed that the door handle of the automobile is operated to open the door and the limit switch 21 operatively associated with the door is turned on. The capacitor $C_{11}$ is charged by the battery 40 through the limit switch 51. The transistor $Tr_{11}$ is turned on and in turn the relay contact 11b is turned on, and voltage of the battery 40 is applied to the contact a of the temperature control unit 300. If the limit switch 51 is turned off due to the opening of the door, the charge in the capacitor $C_{11}$ is discharged through the resistor $R_{11}$ at the rate determined by the time constant of the capacitor/resistor circuit. Therefore the transistor $Tr_{11}$ is maintained until the time constant circuit permits it to be turned off. Likewise, the relay contact 11b is turned off after the time constant period expires. Accordingly, the temperature control unit 300 is kept supplied with power through the relay 11 for the time constant period after detecting the opening of the door. After the constant time, the temperature control unit 300 is supplied with power from the battery 40 through the power supply switch 31 closed in response to the closure of the ignition switch.

When the temperature of the liquid crystal layer 6 is lower than an operative temperature (below which the layer will not respond to the electric field), resistance of the thermistor 32 is high and therefore the reference voltage $V_{20}$ is higher than the detected voltage $V_{10}$. The output voltage $V_{30}$ of the comparator CP1 becomes high and the transistor $Tr_{31}$ is turned on. The relay contact 34b is turned on so that a current is supplied to the heater 33 and the liquid crystal layer 6 is heated. Thus, heating the liquid crystal layer 6 is started when the door handle is operated, i.e. just before the opening of the door so that the liquid crystal layer 6 may be driven into an operative condition as early as possible. Then the reference voltage $V_{20}$ rises on account of voltage feedback of the output voltage $V_{30}$ through the feedback resistor $R_{34}$. Even if the liquid crystal layer 6 is heated and the detected voltage $V_{10}$ rises, the reference voltage $V_{20}$ is set slightly higher than before and current is supplied until attaining temperature corresponding to the reference voltage $V_{20}$ so that the liquid crystal layer 6 is kept heated. As a result of such hysteresis characteristics of the comparator CP1, chattering of the current supply to the heater 33 is prevented. If the temperature of the liquid crystal layer 6 rises to the operative temperature, the resistance of the thermistor 32 decreases and the detected voltage $V_{10}$ becomes higher than the reference voltage $V_{20}$ and the output voltage $V_{30}$ becomes low. The transistor $Tr_{31}$ is turned off and the relay contact 34b is turned off so that current to the heater 33 is interrupted.

Referring to FIG. 6 there is shown an alternative embodiment of a heater circuit. Reference numerals that are the same as those used in FIG. 5 indicate like or corresponding parts and will not be further described. In the FIG. 6 embodiment, the door sensor 500 comprises a limit switch 52, a flip-flop circuit 53 (hereinafter referred to as "FF circuit") for preventing chattering of the limit switch 52, and a pulse generator 54 for receiving the Q-terminal output of the FF circuit 53 and generating a pulse with a constant short pulse width in synchronism with the rising of the Q-terminal output. If the limit switch 52 is positioned as shown in response to the door opening from the closed-door position shown in phantom, the FF circuit 53 is set and the Q-terminal output voltage thereof becomes high. The pulse generator 54 generates a pulse in synchronism with the rising of the Q-terminal output. That is a voltage $V_{50}$ of the pulse generator 54 is generated in one pulse when a transition of the door from closing state to opening state is detected.

The power supply control unit 100 comprises a monostable multivibrator 120, the transistor $Tr_{11}$ connected to Q-terminal thereof, and the relay 11. The monostable multivibrator 120 reveives the voltage $V_{50}$ from the pulse generator 54 and applies a high level voltage to the transistor $Tr_{11}$ for a constant time. Therefore the transistor $Tr_{11}$ is rendered conductive for the constant time to close the relay contact 11$b$ so that the temperature control unit 300 is supplied with power from the battery 40 through the relay 11 for the constant time at the same time as the opening of the door. The power supply control unit 300 operates in the same manner as described with regard to FIG. 5.

In the heater circuit shown in FIGS. 5 and 6, even if the door is kept open too long before the ignition switch is operated for starting the running of automobile, the temperature control unit 300 is supplied with power only for the constant time through the relay 11 after the door is opened first. Accordingly, undesired discharge of the battery 40 is prevented.

The present invention is not limited to the embodiments described above but may be modified in various ways without departing from the spirit of the invention.

What we claim is:

1. A liquid crystal type dazzle-free rear view reflection mirror arrangement in a vehicle comprising:
   a frame body attached to said vehicle and provided with an open front end for the passage of an incident light from the rear of said vehicle;
   a liquid crystal layer provided behind said open front end in said frame body for varying transmittivity of the incident light passing therethrough in dependence on an electric field applied thereto;
   a semi-transparent mirror layer provided behind said liquid crystal layer in said frame body for transmitting therethrough a portion of the incident light passing through said liquid crystal layer and reflecting a portion of the incident light for generating a rear view thereon;
   a photo sensor provided behind said semi-transparent mirror layer in said frame body for sensing the intensity of the incident light passing through said semi-transparent mirror layer; and
   means, responsive to said photo sensor, for applying and controlling the electric field applied to said liquid crystal layer, the magnitude of the electric field being increased with the increase in the intensity of the incident light sensed by said photo sensor.

2. A mirror arrangement according to claim 1, wherein the applying and controlling means comprises:
   electronic drive circuit means for controlling the electric field in accordance with the sensed intensity of the incident light, and
   a pair of transparent electrodes connected to said controlling means and sandwiching said liquid crystal layer for applying the electric field to said liquid crystal layer.

3. A mirror arrangement as set forth in claim 2, wherein said drive circuit means includes:
   means for comparing the intensity of the incident light sensed by said photo sensor with a predetermined reference level; and
   means for supplying said transparent electrodes with a predetermined voltage in response to a first output of said comparing means indicative of the sensed intensity of the incident light being higher than the predetermined reference level.

4. A mirror arrangement as set forth in claim 3, wherein said drive circuit means further includes:
   means, responsive to said comparing means, for increasing said predetermined reference level in response to the first output of said comparing means, the increased predetermined reference level being decreased to said predetermined reference level in response to a second output of said comparing means indicative of the sensed intensity of the incident light being lower than the increased predetermined reference level.

5. A mirror arrangement as set forth in claim 4, wherein said voltage supplying means includes:
   means for generating a first train of pulse signals at a predetermined frequency, said first pulse signals being applied to one of said transparent electrodes; and
   means, responsive to said comparing means and said pulse generating means, for generating a second train of pulse signals in the opposite and same phase relations to the first pulse signals in response to the first and second outputs of said comparing means, respectively, said second pulse signals being applied to the other of said transparent electrodes.

6. A mirror arrangement as set forth in claim 5 further comprising:
   a pair of transparent orientation film layers sandwiching said liquid crystal layer therebetween; and
   a pair of transparent glass layers sandwiching said transparent electrode layers therebetween.

7. A mirror arrangement as set forth in claim 1 further comprising:
   means for installing said drive circuit means behind said semi-transparent mirror layer within said frame body.

8. A mirror arrangement as set forth in claim 7 further comprising:
   means for sensing a temperature of said liquid crystal layer and providing an output indicative thereof; and
   means for heating said liquid crystal layer when said output of said temperature sensing means indicates that the sensed temperature is lower than a predetermined temperature.

9. A mirror arrangement as set forth in claim 8 further comprising:
   means for detecting a manipulation of a door of said vehicle; and
   means for enabling operation of said heating means in response to said detecting means indicating such a manipulation.

10. A mirror arrangement as set forth in claim 9, wherein said detecting means includes:
    a switch operatively associated with a door handle of said door.

11. A liquid crystal type dazzle-free rear view reflection mirror arrangement in an automobile comprising:
    a frame body mounted within said automobile and having a closed shape except an open front end thereof for the passage of an incident light from the rear of said automobile;

a liquid crystal provided within said frame body for varying transmittivity of the incident light passing therethrough in dependence on an electric field applied thereto;

a semi-transparent mirror provided behind said liquid crystal within said frame body for transmitting therethrough and reflecting, for generating a rear view thereon, the incident light passing trough said liquid crystal;

a photo sensor provided behind said semi-transparent mirror within said frame body for sensing the intensity of the incident light transmitted through said semitransparent mirror; and a liquid crystal control circuit connected to said photo sensor for controlling the electric field applied to said liquid crystal, the magnitude of the electric field being increased with the increase in the intensity of the incident light sensed by said photo sensor.

12. A mirror arrangement as set forth in claim 11 further comprising:

a temperature sensor provided within said frame body for sensing a temperature of said liquid crystal;

a door sensor operatively associated with a door of said automobile for detecting an opening operation of said door;

a heater provided within said frame body for heating said liquid crystal when activated; and a heater circuit, connected to said temperature sensor and said door sensor, for activating said heater in response to sensor outputs of said temperature sensor and said door sensor indicative of the sensed temperature being lower than a predetermined temperature and the opening of said door, respectively.

13. A mirror arrangement as set forth in claim 12, wherein said heater circuit includes:

means for limiting an interval of time for activating said heater to a predetermined maximum interval.

14. A mirror arrangement as set forth in claim 13, wherein said liquid crystal control circuit includes:

means for comparing the intensity of the incident light sensed by said photo sensor with a predetermined reference level; and means for applying the electric field to said liquid crystal in response to a first output of said comparing means indicative of the sensed intensity of the incident light being higher than the predetermined reference level.

15. A mirror arrangement as set forth in claim 14, wherein said liquid crystal control circuit further includes:

means responsive to said comparing means for increasing said predetermined reference level in response to the first output of said comparing means, the increased predetermined reference level being decreased to said predetermined reference level in response to a second output of said comparing means indicative of the sensed intensity of the incident light being lower than the increased predetermined reference level.

16. A mirror arrangement as set forth in claim 15, wherein said electric field applying means includes:

means for generating a first train of pulse signals at a predetermined frequency; and means responsive to said pulse generating means for generating the electric field in response to the first output of said comparing means, the direction of the electric field being changed in response to said pulse signals.

17. A mirror arrangement as set forth in claim 13, wherein said door sensor includes:

a switch responsive to a minipulation of a door handle of said door.

18. A liquid crystal type dazzle-free rear view reflection mirror arrangement in a vehicle comprising:

a frame body mounted in said vehicle and having an open front end for a passage of an incident light from the rear of said vehicle;

a transparent glass provided within said front body;

a pair of transparent electrodes provided behind said glass in said frame body for providing an electric field therebetween in response to a voltage applied thereto;

a liquid crystal sandwiched between said electrodes for varying transmittivity of the incident light passing therethrough in dependence on the electric field provided by said electrodes;

a semi-transparent mirror provided behind said electrodes in said frame body for transmitting therethrough a portion of the incident light passing through said liquid crystal and reflecting, for generating a rear view thereon, a portion of the incident light;

a photo sensor provided in said frame body for sensing the intensity of the incident light; and a liquid crystal control circuit connected to said photo sensor for applying the voltage to said electrodes in dependence on the intensity of the incident light sensed by said photo sensor.

19. A mirror arrangement as set forth in claim 18 further comprising:

a heater provided in said frame body for heating said liquid crystal when activated;

a door sensor operatively associated with a door of said vehicle for sensing a manipulation of said door; and a heater control circuit connected to said door sensor for enabling activation of said heater during a predetermined interval of time when the manipulation of said door is sensed by said door sensor.

20. A liquid crystal type dazzle-free rear view reflection mirror arrangement for an automobile comprising:

a frame body mounted within said automobile and having a closed shape except an open front end thereof for the passage of an incident light from the rear of said automobile therethrough;

a liquid crystal provided within said frame body for varying transmittivity of the incident light passing therethrough in dependence on an electric field applied thereto;

a mirror provided behind said liquid crystal within said frame body for reflecting at least a portion of the incident light passing through said liquid crystal for generation of rear view thereon;

a photo sensor supported by said frame body for sensing the intensity of the incident light;

a liquid crystal control circuit connected to said photo sensor for controlling the electric field applied to said liquid crystal, the magnitude of the electric field being increased with the increase in the intensity of the incident light sensed by said photo sensor;

a temperature sensor provided within said frame body for sensing a temperature of said liquid crystal;
a door sensor operatively associated with a door of said automobile for detecting an opening operation of said door;
a heater provided within said frame body for heating said liquid crystal when activated; and
a heater circuit, connected to said temperature sensor and said door sensor, for activating said heater in response to sensor outputs of said temperature sensor and said door sensor indicative of the sensed temperature being lower than a predetermined temperature and the opening of said door, respectively, wherein said mirror is semi-transparent for transmitting therethrough another portion of the incident light passing through said mirror within said frame body and is sensitive to the incident light transmitted through said mirror.

* * * * *